United States Patent [19]

Lee

[11] Patent Number: 5,674,152

[45] Date of Patent: Oct. 7, 1997

[54] SYSTEM FOR CONTROLLING AN INDEPENDENT REARCLUTCH DURING SKIP SHIFTS IN AN AUTOMATIC FOUR-SPEED TRANSMISSION

[75] Inventor: Hee-Yong Lee, Seoul, Rep. of Korea

[73] Assignee: Hyundai Motor Co., Seoul, Rep. of Korea

[21] Appl. No.: 450,861

[22] Filed: May 25, 1995

[30] Foreign Application Priority Data

May 28, 1994 [KR] Rep. of Korea .................. 94-11725

[51] Int. Cl.$^6$ .......................... F16H 61/26; F16H 61/04
[52] U.S. Cl. .................... 477/131; 477/143; 477/906
[58] Field of Search ........................ 477/70, 86, 130, 477/132, 133, 134, 135, 136, 140, 141, 143, 149, 131

[56] References Cited

U.S. PATENT DOCUMENTS

| | | |
|---|---|---|
| 4,662,249 | 5/1987 | Miki et al. ................. 477/132 |
| 4,781,081 | 11/1988 | Shibata et al. ............. 477/143 |
| 5,012,700 | 5/1991 | Takada et al. ............. 477/143 |
| 5,038,636 | 8/1991 | Vukovich et al. ........... 477/144 X |
| 5,131,298 | 7/1992 | Marusue ..................... 477/144 |
| 5,293,790 | 3/1994 | Ohashi et al. ............. 477/131 X |
| 5,383,825 | 1/1995 | El-Khoury et al. ......... 477/149 |
| 5,472,389 | 12/1995 | Ando et al. ................ 477/906 X |

*Primary Examiner*—Khoi Q. Ta

[57] ABSTRACT

A system for controlling an automatic transmission, mounted on a vehicle and connected to an engine, includes a plurality of sensors for sensing vehicle operating conditions. The automatic transmission also includes a plurality of friction elements such as a front clutch and a rear clutch, and the system includes a plurality of shift valves for hydraulically actuating the friction elements to selectively achieve one of a plurality of speed stages. A first and second shift solenoid control the operation of a shift control valve which in turn controls the operation of the shift valves. One of the shift valves, a rear clutch valve, controls the operation of the rear clutch, and a rear clutch solenoid is provided to control the operation of the rear clutch via the rear clutch valve. The rear clutch solenoid controls the rear clutch independently of the control operations performed by the first and second shift solenoids. As a result, a controller can cause a speed stage to be skipped during a shifting operation by controlling the first and second shift solenoids and the rear clutch solenoid.

17 Claims, 7 Drawing Sheets

SYSTEM FOR CONTROLLING AN INDEPENDENT REARCLUTCH DURING SKIP SHIFTS IN AN AUTOMATIC FOUR-SPEED TRANSMISSION

BACKGROUND OF THE INVENTION

1. Field of the Invention

The present invention concerns a system for controlling hydraulic pressure in an automatic four-speed transmission.

2. Description of Related Art

Generally, the automatic transmission includes a system for controlling hydraulic pressure, which automatically works a plurality of clutches and a kickdown servo according to the vehicle speed, the engine load, and the position of the gearshift lever.

The system controls a regulator valve, shift control valve, manual valve, pressure control valve, etc. to apply the hydraulic pressure of an oil pump to selected ones of the clutches and brakes. Hence, the automatic transmission further includes the oil pump fixedly mounted on the crank shaft of the engine, a turbine connected with the drive shaft by means of a spline and positioned opposite to the oil pump, and a torque converter with a stator arranged between the turbine and the oil pump for changing the speed of the oil flow. The torque converter is a hydraulic mechanism using engine power to drive the oil pump, which impels streams of oil against the blades of the turbine. The turbine is connected to the drive shaft and causes it to rotate. The speed and power ratios between the engine and the driving wheels are changed by controlling the hydraulic pressure lines through which the hydraulic pressures are selectively applied to a plurality of clutches.

Referring to FIG. 1 for illustrating an automatic four-speed transmission according to prior art, the shift lever is positioned at one of the forward speeds (D, 2, L) and the vehicle travels in the first speed stage. In this case, the first and second shift control solenoid valves S1 and S2 are turned on. The hydraulic pressure is applied from the N-D control valve V10 to a rear clutch 42 via the clutch release valve V70 to produce the first speed. When shifting the vehicle speed from the first speed to the second speed, the first and second shift control solenoid S1 and S2 are respectively turned off and on, and the hydraulic pressure is applied to the pressure lines L3 and L4 via the manual valve V1. Meanwhile, the pressure control solenoid valve S5 is turned off to move the valve spool of the pressure control valve V5, so that the hydraulic pressure is supplied from the first speed pressure line L3 to the first to second shift valve V3 via the N-D control valve V10. Because the valve spool of the first and second shift valve V3 is moved to the right side by the pressure applied through the second speed pressure line L4, the hydraulic pressure is supplied to the operating chamber of the kickdown servo 45 via the first to second shift valve V3 so that the kickdown servo 45 and the rear clutch 42 work to make the second speed shift.

The vehicle speed being more increased from the second speed, the first and second shift control solenoid S1 and S2 are turned off to supply the hydraulic pressure to the third speed pressure line L5 of the shift control valve V2. The hydraulic pressure in the third speed pressure line is applied to the end clutch 44 via the end clutch valve V4, and moves the valve spool of the second to third/fourth to third shift valve V6 to the right side so as to supply the hydraulic pressure to the front clutch 41 via the first to second shift valve V3. The pressure line for working the front clutch 41 communicates with the release chamber of the kickdown servo 45, and therefore the kickdown servo 45 is released. In addition, the front, rear and end clutches 41, 42 and 44 are worked to make the third speed shift.

Shifting to the fourth speed, the first and second shift control solenoid valves S1 and S2 are turned on and off respectively so as to apply the hydraulic pressure to the fourth speed pressure line L6 of the shift control valve V2. Thus the hydraulic pressure is applied to the left port of the rear clutch release valve V70 via the fourth speed line L6 and to the right port of the second to third/fourth to third shift valve V6 to move the valve spool of the valve V6. Hence, the front clutch 41 and the release chamber of the kickdown servo 45 are blocked from the hydraulic pressure and the rear clutch 42 too because of the valve spool of the rear clutch control valve V70 moved to the right side. In addition, the hydraulic pressure is applied to the supply chamber of the kickdown servo 45, so that the kick down servo 45 is worked together with the end clutch 44 to make a shift of the fourth speed. In this way, by positioning the shift lever at the first speed stage D, only the rear clutch 42 is only worked. In the second speed stage the rear clutch 42 and the kickdown servo 45 are worked. In the third speed stage are the rear, front and end clutches 42, 41 and 44 are worked. In the fourth speed stage are worked the end clutch 44 and kickdown servo 45.

Such a conventional automatic transmission suffers a drawback that the kickdown may not be made directly from the fourth speed to the second speed without undergoing the third speed stage, so that the time for reaching a target speed is undesirably delayed resulting in fuel consumption, malfunction, etc.

In another drawback of the conventional transmission, shifting from third speed to the fourth speed, the rear and front clutches 42 and 41 are released while the kickdown servo 45 is worked. The shift control valve V2 causes the end clutch control valve V4 to block the hydraulic pressure for the front clutch 41 stopping the end clutch 44. On the other hand, the first shift control solenoid valve S1 is worked to apply the hydraulic pressure to the left port of the rear clutch release valve V70 via the fourth line L6 of the shift control valve V2, thus moving the valve spool of the rear clutch release valve V70. Then the hydraulic pressure applied to the rear clutch 42 is discharged through the rear clutch release valve V70 so that the rear clutch 42 is released. In this case, the rear clutch 42 keeps on working until the hydraulic pressure is completely discharged through the rear clutch release valve V70. This causes a time delay of the proper function and a precipitate erosion of the rear clutch 42.

In a further drawback of the conventional transmission, the hydraulic pressure applied from the oil pump 46 via the regulator valve V9 not changed according to the position of the shift lever. Positioning the shift lever at one of the forward speed ranges (D, 2, L) of the first to fourth speed, the friction elements of the clutches are supplied with the same hydraulic pressure. Hence, unnecessarily excessive hydraulic pressures are required resulting in fuel consumption. In brief, the conventional system controls each of the clutches by working the first and second solenoid valves S1 and S2, and then the working of the front clutch 41 and the kickdown servo 45 is necessary to control the rear and end clutches 42 and 44. Namely, the rear and end clutches 42 and 44 may not be independently controlled. Consequently, the continuous shift from the fourth to the third to the second speed or vice versa or the high-speed shift from the third to the fourth speed is slowly performed.

SUMMARY OF THE INVENTION

An object of the present invention is to provide a system for controlling hydraulic pressure in an automatic four-speed transmission, which allows a direct control of the rear clutch independently from the working of the shift control valve so as to skip a shift in kickdown.

Another object of the present invention is to provide means for quickly releasing the rear clutch from working in an automatic four-speed transmission.

A further object of the present invention is to provide means for changing the hydraulic pressure of the regulator valve according to the gearshift stages in order to prevent excessive pressures from being applied to the friction elements in an automatic four-speed transmission.

According to an embodiment of the present invention, a system for controlling hydraulic pressure in an automatic four-speed transmission comprises:

- an T/M output revolution evaluation sensor for detecting the number of the T/M output revolutions;
- a throttle valve sensor for detecting the load applied to the engine according the vehicle speed;
- a vehicle speed sensor for detecting the vehicle speed;
- a gearshift control for controlling a plurality of hydraulic pressure lines to make a shifting of the vehicle speed according to the output signals of the three sensors;
- a first and second shift control solenoid valves for controlling a plurality of shift valves to control the hydraulic pressures according to the output signal of the gearshift control; and
- a rear clutch control solenoid valve for controlling the rear clutch according to the output signal of the gearshift control.

According to another embodiment of the present invention, a system for controlling hydraulic pressure in an automatic four-speed transmission comprises:

- an oil pump for producing hydraulic pressure by using engine power;
- a regulator valve for regulating the hydraulic pressure produced by the oil pump according to the phases of a manual valve and a pressure control solenoid valve, the phases being changed according to the vehicle speed stages, the manual valve changing the phase by means of a shift lever;
- a shift control valve for supplying the hydraulic pressure from the manual valve to a plurality of shift valves according to the output signals of the first and second shift control solenoid valves, the shift valves including first and second shift valves being controlled by the hydraulic pressure applied via the shift control valve and the pressure control valve;
- a pressure control valve for supplying the hydraulic pressure from the manual valve to the shift valves in the speed stages other than the first speed stage under the control of the hydraulic pressure applied through a reducing valve;
- a second to third/fourth to third shift valve for passing or blocking the hydraulic pressure applied via the first and second shift valves so as to work the front clutch and to release the kickdown brake; and
- a rear clutch release valve for passing or blocking the hydraulic pressure applied to the rear clutch via the manual valve under the control of the control pressure applied via the reducing valve according to the control signal of the gearshift control.

The present invention will now be described more specifically with reference to the drawings attached only by way of example.

BRIEF DESCRIPTION OF THE ATTACHED DRAWINGS

DETAILED DESCRIPTION OF PREFERRED EMBODIMENTS

Figure 1:
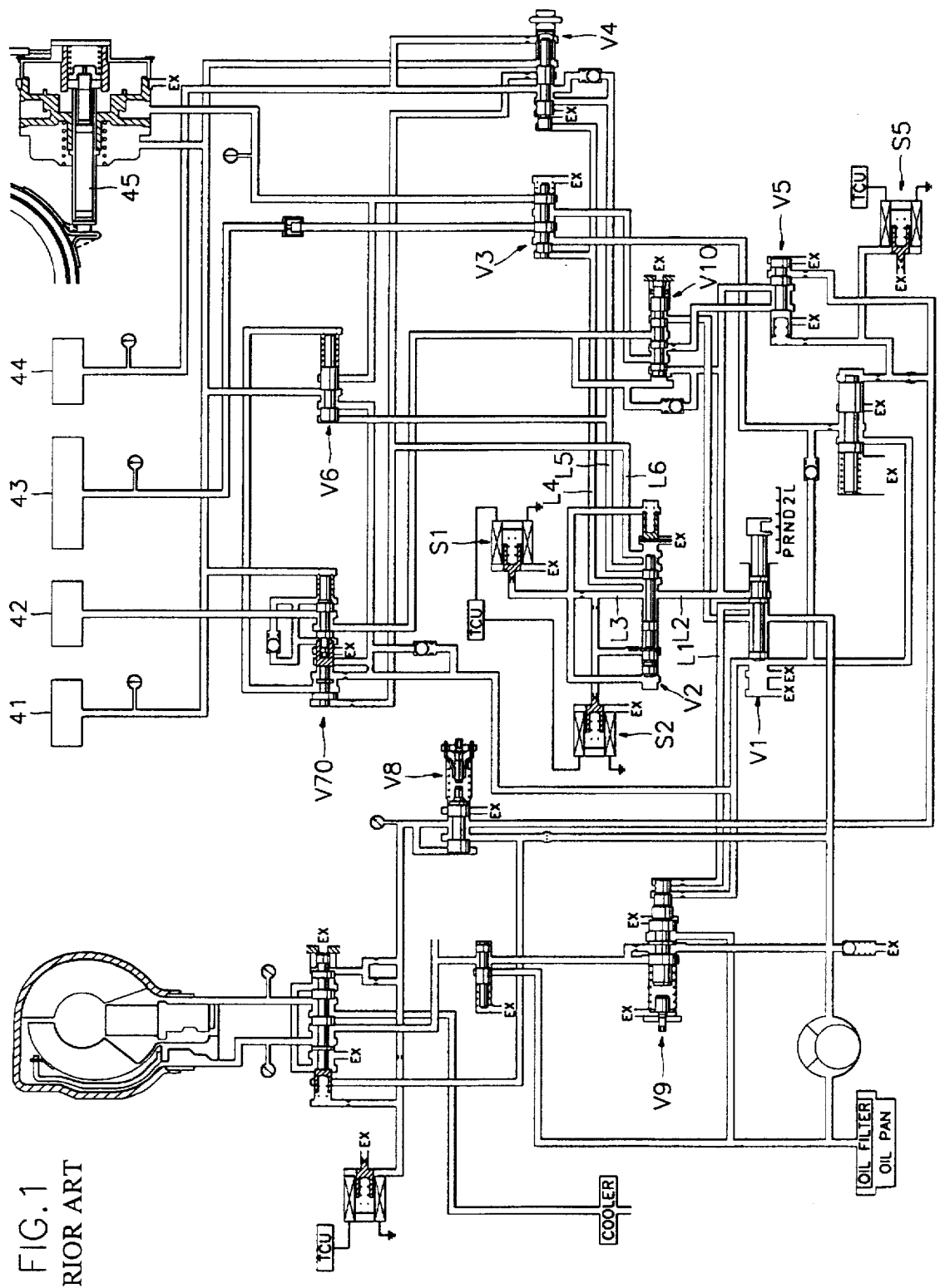
FIG. 1 is a schematic diagram for illustrating a hydraulic pressure control circuit for controlling a conventional automatic four-speed transmission.
Figure 2:
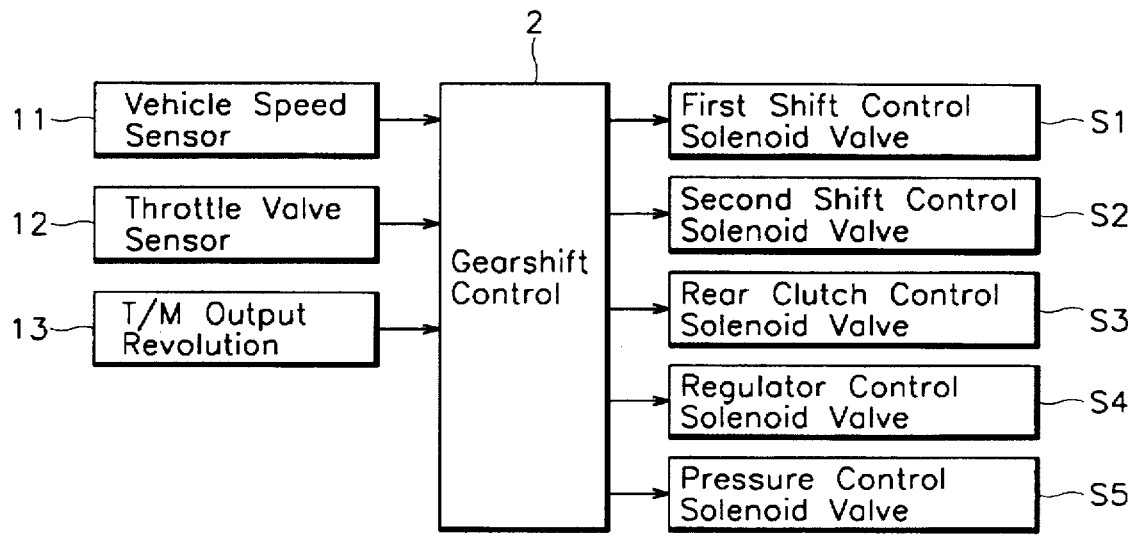
FIG. 2 is a block diagram for visualizing a hydraulic pressure control system for an automatic four-speed transmission according to an embodiment of the present invention.

Referring to FIG. 2, a hydraulic pressure control system for an automatic four-speed transmission comprises a vehicle speed sensor 11 for detecting the moving speed of a vehicle, a throttle valve sensor 12 for detecting the amount of opening of a throttle valve, the amount of opening being changed by pressing a acceleration pedal, an T/M output revolution evaluation sensor 13 for detecting the number of revolutions of an engine, a gearshift control 2 for determining the travelling speed of the vehicle by analyzing the output signals of the three sensors so as to generate shift control signals, a plurality of solenoid valves for controlling a shift control valve, a rear clutch release valve, a regulator valve and a pressure control valve according to the shift control signals. The solenoid valves include first and a second shift control solenoid valves S1 and S2 for controlling the shift control valve, a rear clutch control solenoid valve S3 for controlling the rear clutch release valve, a regulator control solenoid valve S4 for controlling the regulator valve, and a pressure control solenoid valve S5 for controlling the pressure control valve.

Figure 3A:
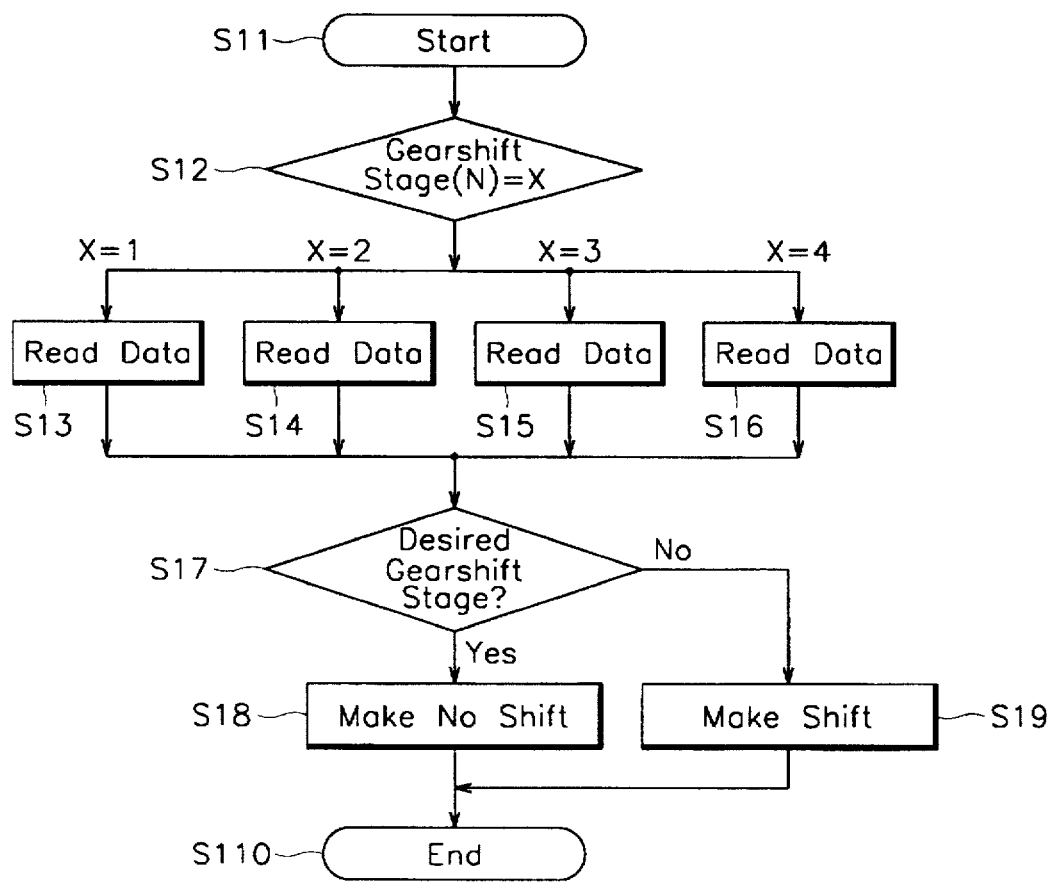
FIGS. 3A to 3C are flow charts for illustrating the steps of operating the inventive hydraulic pressure control system.
Figure 3B:
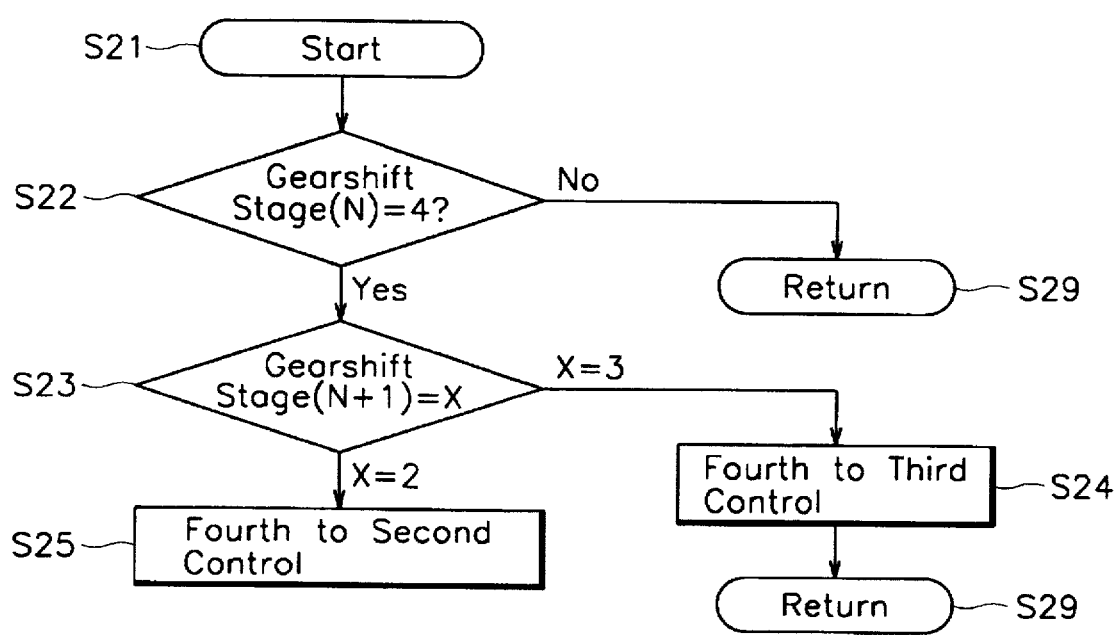

Referring to FIG. 3A, when the vehicle travels, the gearshift control 2 detects the travelling state of the vehicle to determine the working gearshift stage (producing one of the first to fourth speeds) in step S12, and also reads four kinds of data in steps S13-S16, which data are stored in a memory respectively at four addresses representing four speeds, in order to determine in step S17 whether the vehicle travels in the gearshift stage that fits a desired vehicle speed. If the vehicle travels in the proper gearshift stage, the gearshift control 2 does not change the hydraulic pressure to make a shift, as shown in step S18. Nevertheless, if the hydraulic pressure is changed, there may occur an unwanted release of the working clutches or brakes. Hence, the pressure control solenoid valve S4 should not be worked.

On the contrary, if the vehicle does not travel in the gearshift stage to produce the desired speed, the gearshift control 2 employs the data stored in the memory representing the proper gearshift stage to produce the duty ratio of the shift control signal to control the pressure control solenoid valve S4 in step S19. Thus the pressure in the hydraulic pressure line L1 of a manual valve V1 is changed applied to the right port of the regulator valve V9. Namely, the control pressure of the regulator valve V9 is determined by the amount of opening of the manual valve V1 and the working of the pressure control solenoid valve S4 according to the gearshift stages. Hence, the hydraulic pressure can be normally controlled without slipping of the working elements and there is prevented unnecessary fuel consumption.

Hereinafter, there will be described the kickdown from the fourth speed to the second speed occurring during a desired shift, with reference to FIGS. 3A to 3C and 4A to 4C.

Figure 4A:
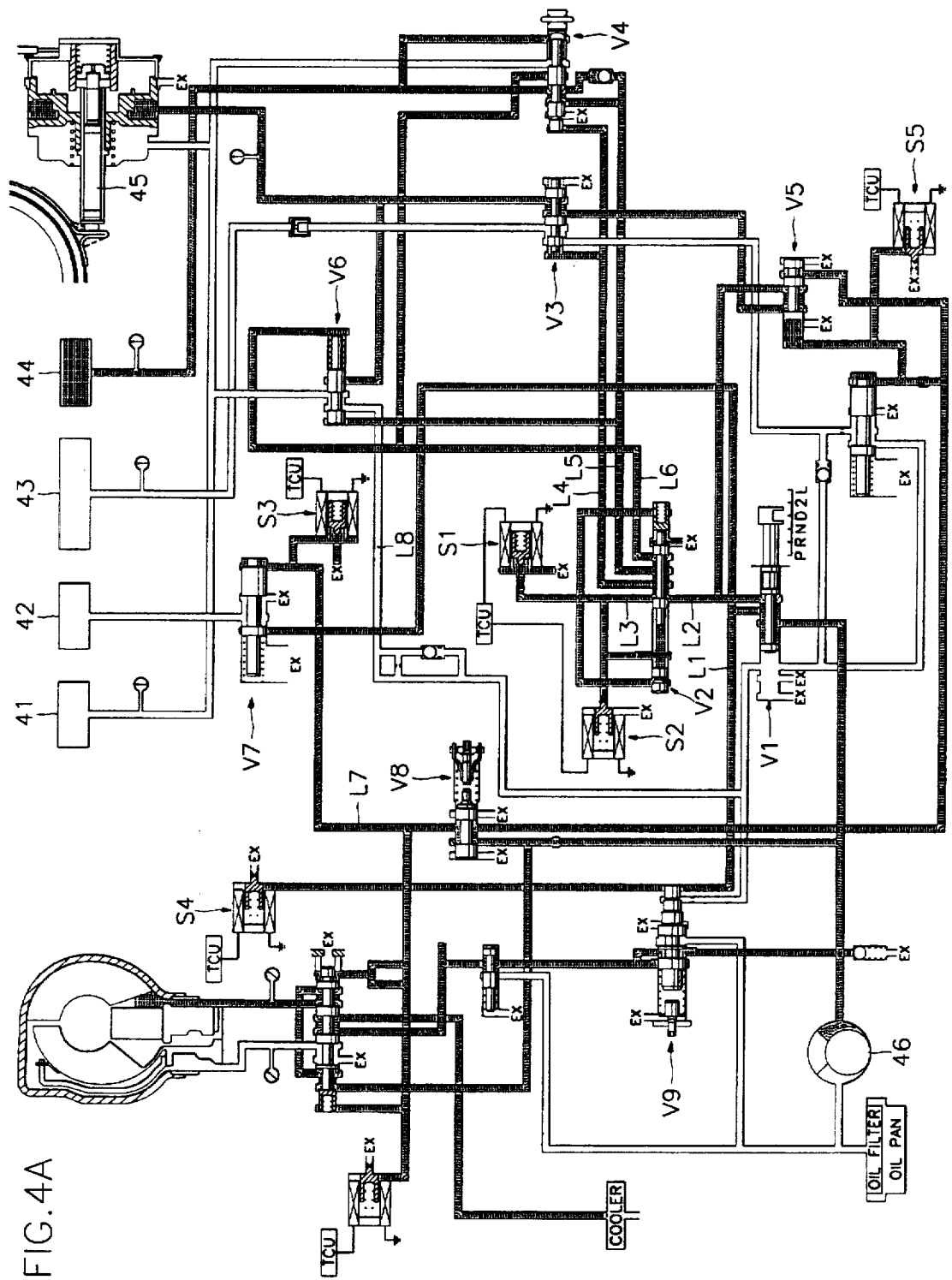
FIGS. 4A to 4C are a schematic diagram for illustrating a hydraulic pressure control circuit for controlling the inventive automatic four-speed transmission.

The gearshift control 2 determines whether the vehicle travels in the gearshift stage of the fourth speed according to the signals produced from the vehicle speed sensor 11, throttle valve sensor 12 and T/M output revolution evaluation sensor 13, in step S22. The throttle valve sensor 12 detects the amount of opening of the throttle valve to determine the amount of the engine load. In this case, if the gearshift stage indicates other than the fourth speed, the gearshift control 2 returns to the main program in step S29. However, if the gearshift stage indicates the fourth speed, the gearshift control 2 determines in step S23 whether the vehicle travels at the second or third speed according to the signals produced from the vehicle speed sensor 11, throttle valve sensor 12 and T/M output revolution evaluation sensor 13. Reference is made to FIG. 4A to describe the process of controlling the hydraulic pressure.

The gearshift control 2 turns the first shift control solenoid valve S1 on and the second shift solenoid valve S2 off so as to apply the hydraulic pressure to the right port of the second to third/fourth to third shift valve V6 through the fourth speed line L6 of the shift control valve V2. Then the valve spool of the second to third/fourth to third shift valve V6 is moved to the left side so as to check the hydraulic pressure applied through the first to second shift valve V3 to the front clutch 41 while the hydraulic pressure to have been applied to the front clutch 41 is discharged through the hydraulic line L8 of the second to third/fourth to third shift valve V6 to the discharge line of the manual valve V1 to release the front clutch 41 and the kickdown servo 45, which have worked to produce the third speed. Meanwhile, the hydraulic pressure applied through the second speed line L4 of the shift control valve V2 pushes the valve spool of the end clutch valve V4 to the right side, so that the hydraulic pressure applied through the third speed line L5 of the shift control valve V2 works the end clutch 44 via the end clutch valve V4.

Moreover, the hydraulic pressure applied through the second speed line L4 of the shift control valve V2 pushes the valve spool of the first to second shift valve V3 to the right side so that the hydraulic pressure is applied from the manual valve V1 to the kickdown servo 45 via the pressure control valve V5 and the first to second shift valve V3. In order to release the rear clutch 42, which is an element for producing the third speed, the rear clutch solenoid valve S3 is turned on so that the hydraulic pressure applied to the right port of the rear clutch release valve V7 via the pressure line L7 of the reducing valve V8 is discharged through the clutch control solenoid valve S3 to return the valve spool of the rear clutch release valve V7 to the right side as shown in FIG. 4A. Then the hydraulic pressure applied to the rear clutch 42 via the pressure line L1 of the manual valve V1 and the rear clutch release valve V7 is checked to release the rear clutch 42.

Figure 4B:
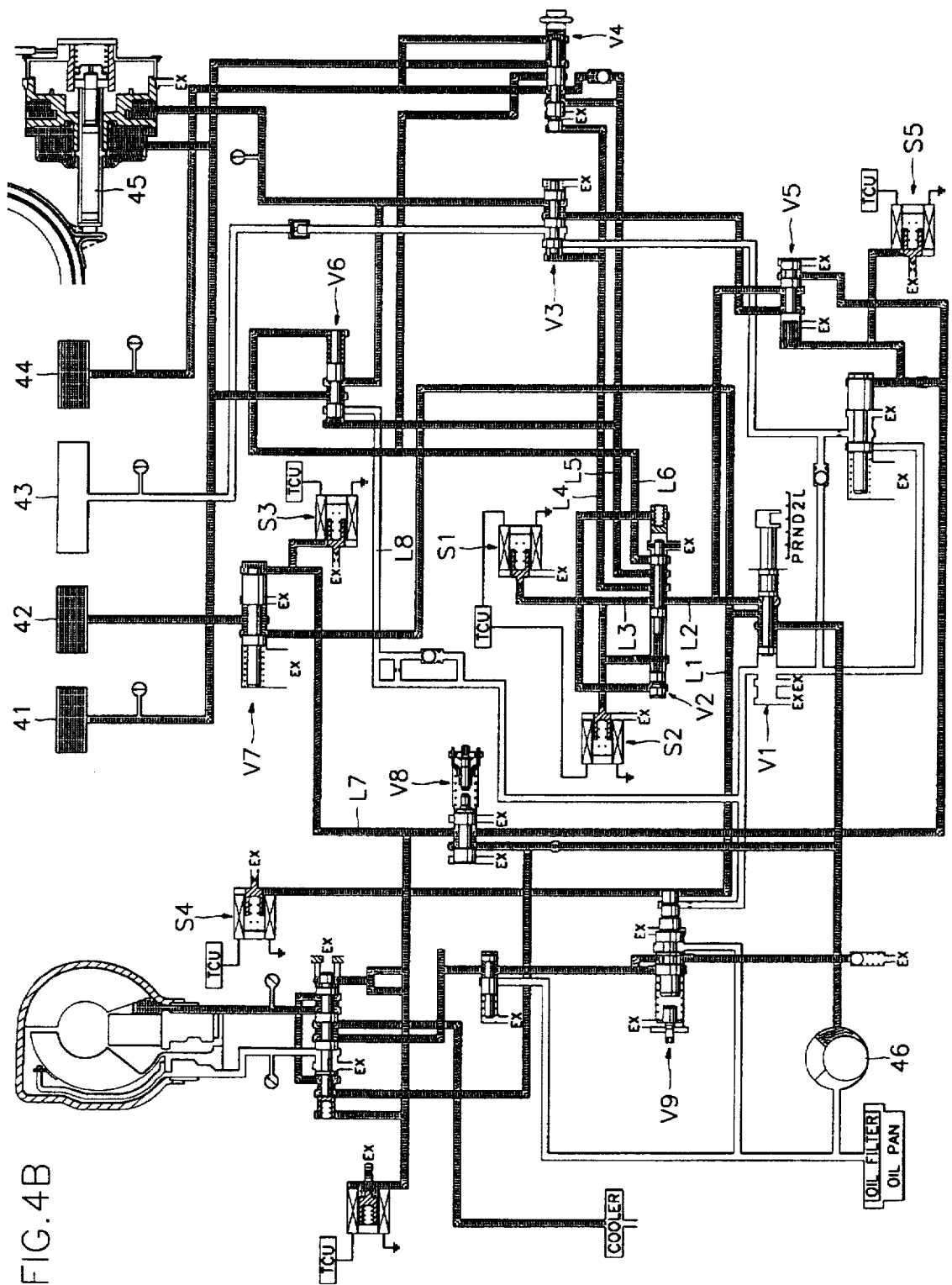

In this case, if the shift lever is positioned in the range "D" and the vehicle travels in the gearshift stage of the fourth speed, and if the output signals of the vehicle speed sensor 11 and the throttle valve sensor 12 indicate the third speed in step S23, the gearshift control 2 shifts the gearshift from the fourth speed stage to the third speed stage in step S24. To this end, the gearshift control 2 turns the first shift control solenoid valve S1 off, as shown in FIG. 4B, and maintains the second shift control solenoid valve S2 off. Thus the hydraulic pressure is applied only to the third speed line L3 to L5 of the shift control valve V2, and therefore the hydraulic pressure is applied to the end clutch 44 via the third speed line L5 and the end clutch valve V4. In addition, the port of the shift control valve toward the fourth speed line L6 is checked so that the hydraulic pressure is applied to the left port of the second to third/fourth to third shift valve V6, thus moving the valve spool to the right side. This allows the second to third/third to fourth shift valve V6 to pass the hydraulic pressure applied from the pressure line L2 of the manual valve V1 to the front clutch 41 via the pressure control valve V5 and the first to second shift valve V3.

Figure 4C:
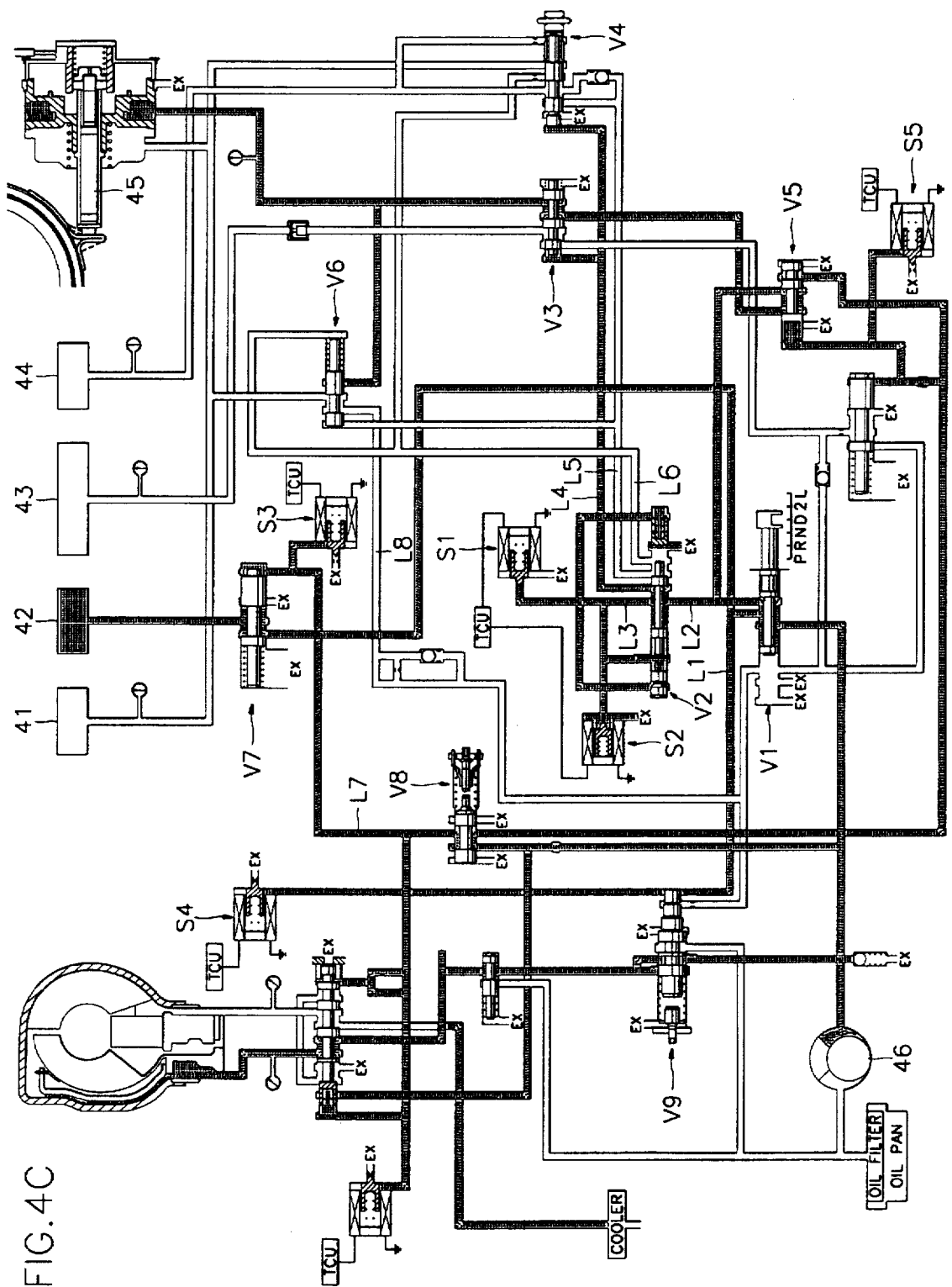

The hydraulic pressure line for driving the front clutch 41 communicates with the release chamber of the kickdown servo 45, so that the kickdown servo 45 is released and the front, rear and end clutches 41, 42 and 44 are worked to make a shift of the third speed. But, if the speed change of the vehicle is observed as a skipdown shift directly to the second speed instead of a sequential down shift to the third speed, the gearshift control 2 directly makes the skipdown shift to the second speed in step S25. Namely, the gearshift control 2 turns the first shift control solenoid valve S1 off and the second shift control solenoid valve S2 on as shown in FIG. 4C so that the pressure lines L3 and L4 for the first and second speeds only passes the hydraulic pressure from the line L2 of the manual valve V1. The second speed pressure line L4 of the shift control valve V2 passes the hydraulic pressure to move the valve spool of the end clutch valve V4 to the right side, so that the port for connecting the chamber of the end clutch valve V4 with the third speed pressure line L5 of the shift control valve V2 is blocked to release the end clutch 44.

In order to work the rear clutch 42, which is an element for producing the second speed, the gearshift control 2 turns the rear clutch control solenoid valve S3 off. This allows the hydraulic pressure in the pressure line L7 of the reducing valve V8 to move the spool valve of the rear clutch release valve V7 to the left side. Hence the hydraulic pressure in the pressure line L1 of the manual valve V1 is directly applied to the rear clutch 42 via the rear clutch release valve V7. Thus the rear clutch 42 is controlled by the gearshift control 2 independently from the shift control valve V2, so that the skipdown shift may be made directly from the fourth speed to the second speed. In step S26, the gearshift control 2 determines whether the vehicle speed is at the third speed or the fourth speed according to the output signals of the vehicle speed sensor 11 and the throttle valve sensor 12.

When shifting the vehicle speed up from the present second speed to the third speed, the gearshift control 2 closes the second shift control solenoid valve S2 as described above. Then the hydraulic pressure is applied to the left port of the second to third/fourth to third shift valve V6 via the third speed pressure line L5 of the shift control valve V2 to move the valve spool to the right side. This causes the hydraulic pressure in the pressure line L2 of the manual valve V1 to work the front clutch 41 and to release the kickdown servo 45 from the second speed stage via the pressure control valve V5 and the first and second shift valve V3. The hydraulic pressure is also applied from the third speed line L5 of the shift control valve V2 to the end clutch 44 while the gearshift control 2 maintains the rear clutch control solenoid valve S3 off to keep the rear clutch 42 working. Hence, the front, rear and end clutches 41, 42 and 44 are worked to make an up shifting to the third speed.

However, when the vehicle speed is observed making a shift to skip from the second speed up to the fourth speed, the gearshift control 2 controls the first and second shift control solenoid valves S1 and S2 and the rear clutch control solenoid valve s3, as described above. In this manner, the kickdown servo 45 is kept on working, and the rear clutch control solenoid valve S3 is turned on to exhaust the hydraulic pressure applied to the right port of the rear clutch release valve V7 via the pressure line L7 of the reducing valve V8, thereby releasing the rear clutch 42. In addition, the end clutch 44 is worked by the hydraulic pressure applied via the pressure line L5 and the end clutch valve V4, so that the shift for the fourth speed is obtained.

Figure 3C:
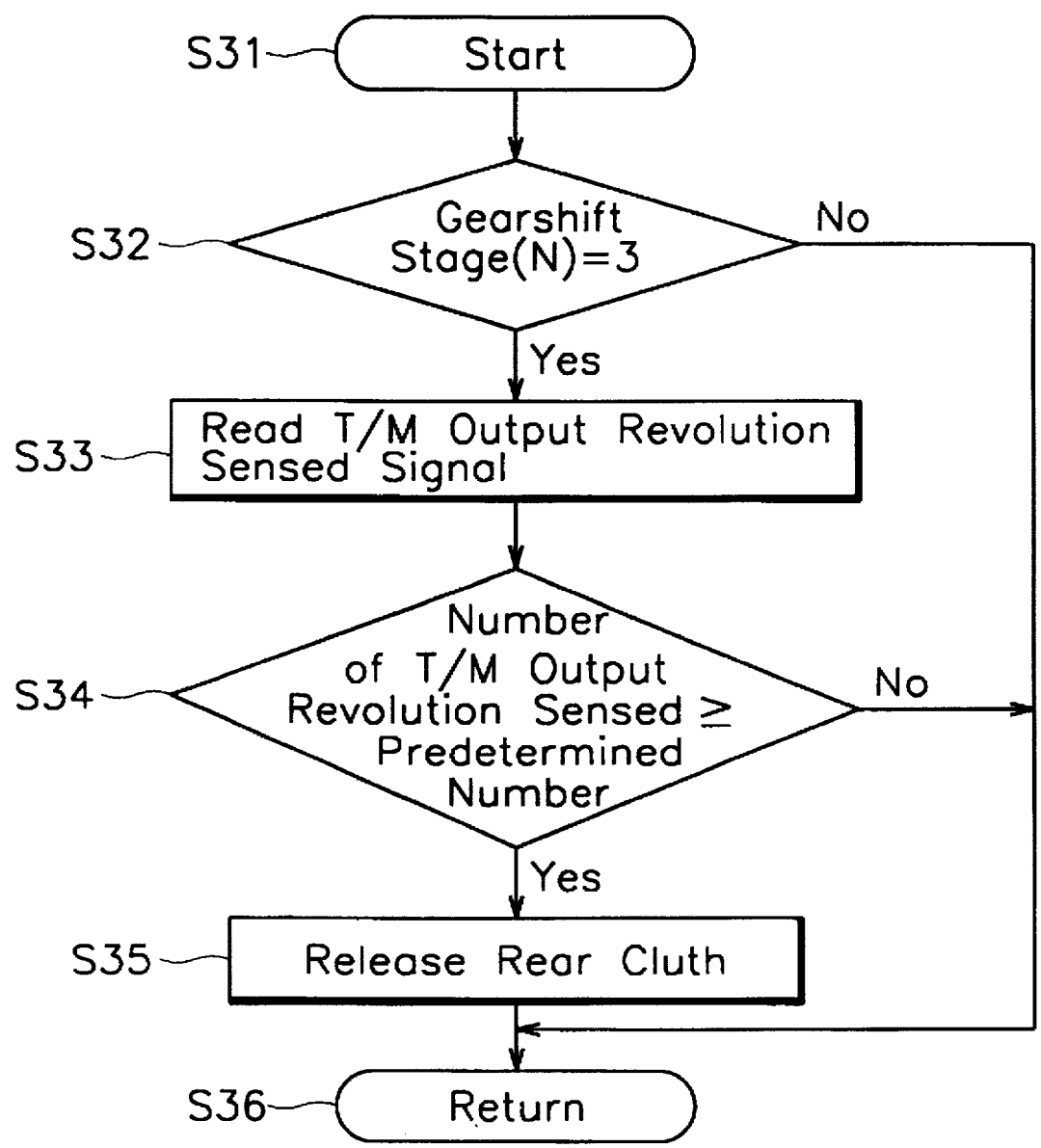

As described above, when the kickdown shift occurs, the shift is directly obtained from the fourth speed to the second speed resulting in a quick and precise shift control. Meanwhile, when the number of the T/M output revolutions is increased greater than the predetermined number after shifting from the second speed up to the third speed, the gearshift control 2 turns the rear clutch control solenoid valve S3 on so as to quickly release the rear clutch 42 from the hydraulic pressure, thereby keeping the rear clutch 42 from precipitate erosion. To this end, the gearshift control 2 determines, as shown in FIG. 3C, whether the present gear shifting indicates the third speed in step S32. If the shifting indicates the third speed, the output signal of the T/M output revolution evaluation sensor 13 is read in step S33. In step S34, if the number of the T/M output revolutions is greater than the predetermined number, the gearshift control 2 turns the rear clutch control solenoid valve S3 on. Then the hydraulic pressure applied through the pressure line L7 of the reducing valve V8 is discharged to move the valve spool of the rear clutch release valve V7 to the right side so as to quickly release the rear clutch 42 from the hydraulic pressure.

But, in step S32, if the present gear shifting is observed to indicate one of the other forward speeds other than the third speed, the gearshift control does not release returning to the main program in step S36. Likewise, if the number of the T/M output revolutions is less than the predetermined number not indicating the fourth speed, the gearshift control does not release the rear clutch 42 returning to the main program in step S36.

Consequently, an additional solenoid valve S3 is employed by the gearshift control 2 to directly control the rear clutch 42 to quickly release independently with the controlling of the front clutch the kickdown servo 45, thereby keeping the rear clutch from precipitate erosion.

What is claimed is:

1. A system for controlling an automatic transmission mounted on a vehicle and connected to an engine, wherein said automatic transmission includes a plurality of friction elements, said friction elements including at least a front clutch, a rear clutch, and an end clutch, said system comprising:

sensing means for sensing vehicle operating conditions;

hydraulic means for hydraulically actuating said friction elements to selectively achieve one of a plurality of speed stages;

shift solenoid means for controlling said hydraulic means, said shift solenoid means including rear clutch solenoid means for controlling said rear clutch independently of said shift solenoid means; and control means for controlling said shift solenoid means based on said sensed vehicle operating conditions, said control means determining whether to shift speed stages based on said sensed vehicle operating conditions, and if said control means determines to shift speed stages, said control means further determines whether to skip a certain speed stage when shifting speed stages, and said control means controls said shift solenoid means and said rear clutch solenoid means if said control means determines to skip said certain speed stage when shifting speed stages.

2. The system of claim 1, wherein said sensing means comprises:

first detecting means for detecting a speed of an engine connected to said automatic transmission;

second detecting means for detecting an opening degree of a throttle valve for said engine; and third detecting means for detecting a speed of said vehicle.

3. The system of claim 2, wherein said second detecting means includes a throttle valve sensor designed to detect the amount of opening of the throttle valve, said amount of opening being changed based on activation of an acceleration pedal.

4. The system of claim 1, wherein said shift solenoid means further includes a first shift solenoid and a second shift solenoid for controlling said hydraulic means.

5. The system of claim 4, wherein said rear clutch solenoid means includes a rear clutch solenoid which controls operation of said rear clutch independently of said first and second shift solenoids.

6. The system of claim 6, wherein said rear clutch solenoid means controls a portion of said hydraulic means such that said rear clutch solenoid means controls said rear clutch independently of said shift solenoid means.

7. The system of claim 1, further comprising:

a pressure control solenoid valve for controlling hydraulic pressure of said hydraulic means.

8. The system of claim 7, wherein if said control means determines not to shift speed stages, said control means controls said pressure control solenoid valve based on control data stored by said control means which corresponds to a current speed stage.

9. The system of claim 1, wherein said certain speed stage is third gear.

10. The system of claim 1, wherein if said control means determines to shift speed stages from a first speed stage to a second speed stage, said second speed stage being a lower speed stage than said first speed stage, said control means determines whether one of said sensed vehicle operating conditions is greater than a predetermined threshold, if said control means determines that said one of said sensed vehicle operating conditions is greater than said predetermined threshold, said control means controls said shift solenoid means and said rear clutch solenoid means to shift said automatic transmission to a third speed stage which is lower than said second speed stage.

11. The system of claim 2, wherein if said control means determines to shift speed stages from a first speed stage to a second speed stage, said second speed stage being a lower speed stage than said first speed stage, said control means determines whether said detected engine speed is greater than a predetermined threshold, if said control means determines that said detected engine speed is greater than said predetermined threshold, said control means controls said shift solenoid means and said rear clutch solenoid means to shift said automatic transmission to a third speed stage which is lower than said second speed stage.

12. The system of claim 11, wherein said second speed stage is third gear.

13. The system of claim 1, wherein said hydraulic means includes, an oil pump using power generated by said engine connected to said automatic transmission to generate hydraulic pressure, a regulator valve regulating said generated hydraulic pressure, a plurality of shift valves hydraulically actuating said friction elements to selectively achieve one of a plurality of speed stages, said plurality of shift valves including a rear clutch valve actuating said rear clutch, and a shift control valve controlling a supply of said regulated hydraulic pressure to said plurality of shift valves except said rear clutch valve;

said shift solenoid means controls operation of said shift control valve; and said rear clutch solenoid means controls said rear clutch valve independently from said operation of said shift control valve.

14. A hydraulic control system for an automatic transmission which includes a plurality of friction elements, said friction elements including at least a front clutch, a rear clutch, and an end clutch, said system comprising:

an oil pump using power generated by an engine connected to said automatic transmission to generate hydraulic pressure;

a regulator valve regulating said generated hydraulic pressure;

a plurality of shift valves hydraulically actuating said friction elements to selectively achieve one of a plurality of speed stages, said plurality of shift valves including a rear clutch valve actuating said rear clutch;

a shift control valve controlling a supply of said regulated hydraulic pressure to said plurality of shift valves except said rear clutch valve;

a first and second shift solenoid controlling operation of said shift control valve;

a rear clutch solenoid controlling said rear clutch valve independently from said operation of said shift control valve.

15. The system of claim 14, further comprising:

a pressure regulator solenoid controlling said regulator valve.

16. The system of claim 14, further comprising:

a pressure control solenoid; and a manual valve producing a control hydraulic pressure from said generated hydraulic pressure; and wherein said regulator valve regulates said generated hydraulic pressure based on said control hydraulic pressure and operation of said pressure control solenoid.

17. The system of claim 14, further comprising:

sensing means for sensing vehicle operating conditions; and control means for controlling said first and second shift solenoids and said rear clutch solenoid based on said sensed vehicle operating conditions.

* * * * *